(12) United States Patent
Honda et al.

(10) Patent No.: US 8,426,527 B2
(45) Date of Patent: Apr. 23, 2013

(54) CROSSLINKABLE FLUORORUBBER COMPOSITION AND CROSSLINKED RUBBER ARTICLE

(75) Inventors: Makoto Honda, Tokyo (JP); Tomoyuki Fujita, Tokyo (JP); Kunio Watanabe, Tokyo (JP); Daisuke Shirakawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/427,355

(22) Filed: Mar. 22, 2012

(65) Prior Publication Data

US 2012/0202950 A1 Aug. 9, 2012

Related U.S. Application Data

(63) Continuation of application No. PCT/JP2010/067161, filed on Sep. 30, 2010.

(30) Foreign Application Priority Data

Oct. 1, 2009 (JP) .................................. 2009-229424

(51) Int. Cl.
*C08L 27/12* (2006.01)
(52) U.S. Cl.
USPC ...................... 525/276; 525/326.2; 525/326.3; 525/326.4; 526/247
(58) Field of Classification Search .................. 525/276, 525/326.2, 326.3, 326.4; 526/247
See application file for complete search history.

(56) References Cited

U.S. PATENT DOCUMENTS 5,268,405 A 12/1993 Ojakaar
5,948,868 A * 9/1999 Albano et al. ................ 525/276

FOREIGN PATENT DOCUMENTS

| JP | 7-179705 | 7/1995 |
|---|---|---|
| JP | 08-508532 | 9/1996 |
| JP | 09-124870 | 5/1997 |
| JP | 2008-106036 | 5/2008 |
| JP | 2009149835 A * | 7/2009 |
| JP | 2009-197210 | 9/2009 |
| JP | 2010-084000 | 4/2010 |
| WO | 2005-068534 | 7/2005 |

OTHER PUBLICATIONS

Machine Translation of JP 2009-149835 (2012).*
International Search Report issued Dec. 21, 2010 in PCT/JP2010/06761, filed Sep. 30, 2010.
Edited by Satokawa, Handbook of Fluororesins, pp. 616-622, 577-578 (published 1990 by The Nikkan Kogyo Shinbum, Ltd.).

* cited by examiner

*Primary Examiner* — Mark Kaucher
(74) *Attorney, Agent, or Firm* — Oblon, Spivak, McClelland, Maier & Neustadt, L.L.P.

(57) ABSTRACT

Obtaining a crosslinked rubber with high flexibility at low temperature includes crosslinking a fluororubber composition. The fluororubber composition includes a fluororubber and a compound of formula $(X-)_x(Z-)_zY$. In the formula, X is $U-(CF_2)_aO(CF_2CF_2O)_b-$; Z is $R^FO(CF_2CF_2O)_c-$; Y is a (x+z) valent perfluoro saturated hydrocarbon group, optionally interrupted by an etheric oxygen atom; x is an integer of at least 3; z is an integer of at least 0; U is a monovalent group with an unsaturated hydrocarbon, a bromine atom, an iodine atom, or a combination thereof; $R^F$ is a $C_{1-20}$ linear perfluoroalkyl group, optionally interrupted by an etheric oxygen atom; a is an integer of from 0 to 20; b is an integer of from 1 to 200; and c is an integer of from 3 to 200.

11 Claims, No Drawings

CROSSLINKABLE FLUORORUBBER COMPOSITION AND CROSSLINKED RUBBER ARTICLE

This application is a continuation of PCT/JP2010/067161, filed Sep. 30, 2010.

TECHNICAL FIELD

The present invention relates to a crosslinkable fluororubber composition which can give a crosslinked rubber article excellent in flexibility at a low temperature, and the crosslinked rubber article obtained therefrom.

BACKGROUND ART

As crosslinking treatment of a fluororubber, a method of peroxide-crosslinking a fluororubber by mixing it with an organic peroxide and heating the mixture, or a method of radiation-crosslinking a fluororubber by irradiating it with radioactive rays, as disclosed in the following Patent Document 1, have been known. At that time, in order to improve the crosslinking property of a fluororubber or the properties of a crosslinked rubber article obtainable, heretofore, a polyfunctional compound has been blended as a crosslinking coagent.

As the polyfunctional compound, triallyl isocyanurate has been preferably used (See Non-Patent Document 1 and Patent Document 1). By using triallyl isocyanurate as a crosslinking coagent, it is possible to improve a crosslinking rate of a fluororubber. Further, a triazine ring structure excellent in the heat resistance is inserted into a crosslinking site of a fluororubber, and therefore it is advantageous in that a crosslinked rubber article excellent in the heat resistance or mechanical properties is obtainable.

PRIOR ART DOCUMENT

Non-Patent Document

Non-Patent Document 1: Handbook of Fluororesins, pages 616 to 622 and 577 to 578, edited by Satokawa (published in 1990 by THE NIKKAN KOGYO SHIMBUN, LTD.)

Patent Document

Patent Document 1: JP-A-7-179705

DISCLOSURE OF INVENTION

Technical Problem

However, a fluororubber, especially a fluororubber having a tetrafluoroethylene as a copolymer component is poor in flexibility at a low temperature, and thus had a problem in sealing property under a low temperature environment.

Accordingly, it is an object of the present invention to provide a crosslinkable fluororubber composition which can give a crosslinked rubber article excellent in flexibility at a low temperature, and the crosslinked rubber article.

Solution to Problem

The present invention provides the following:

[1] A crosslinkable fluororubber composition comprising a fluororubber and a compound represented by the following formula (A):

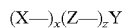

wherein X is a group represented by the following formula (X), Z is a group represented by the following formula (Z), Y is a (x+z) valent perfluoro saturated hydrocarbon group or such a group having an etheric oxygen atom inserted between carbon atoms thereof, x is an integer of at least 3, z is an integer of at least 0, x+z is an integer of at least 3,

wherein U is a monovalent group having at least one member selected from the group consisting of an unsaturated hydrocarbon, a bromine atom and an iodine atom, $R^F$ is a $C_{1\text{-}20}$ linear perfluoroalkyl group or such a group having an etheric oxygen atom inserted between carbon atoms thereof, a is an integer of from 0 to 20, b is an integer of from 1 to 200, and c is an integer of from 3 to 200.

[2] The crosslinkable fluororubber composition according to [1], wherein the compound represented by the formula (A) is a compound represented by the following formula (A1):

wherein x1 is an integer of 3 or 4.

[3] The crosslinkable fluororubber composition according to [2], wherein x1 in the formula (A1) is 3, and Y is any one of the groups $(Y^3\text{-}1)$ to $(Y^3\text{-}4)$ represented by the following formulae:

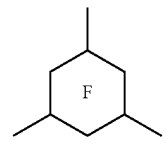

[4] The crosslinkable fluororubber composition according to [1], wherein the compound represented by the formula (A) is a compound represented by the following formula (A2):

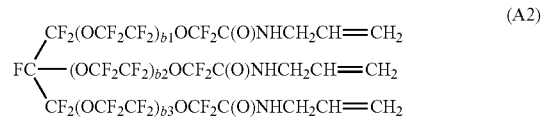

wherein each of b1, b2 and b3 which are independent of one another, is an integer of from 1 to 20.

[5] The crosslinkable fluororubber composition according to any one of [1] to [4], wherein the compound represented by the formula (A) has a number average molecular weight (Mn) of from 500 to 100,000.
[6] The crosslinkable fluororubber composition according to any one of [1] to [5], wherein the compound represented by the formula (A) has a ratio (Mw/Mn) of the mass average molecular weight (Mw) to the number average molecular weight (Mn) of from 1.0 to 2.0.
[7] The crosslinkable fluororubber composition according to any one of [1] to [6], which contains the compound represented by the formula (A) in an amount of from 1 to 50 parts by mass per 100 parts by mass of the fluororubber.
[8] The crosslinkable fluororubber composition according to any one of [1] to [7], wherein the fluororubber is at least one member selected from the group consisting of
a tetrafluoroethylene/propylene copolymer,
a vinylidene fluoride/tetrafluoroethylene/hexafluoropropylene copolymer and
a tetrafluoroethylene/perfluoroalkyl vinyl ether copolymer.
[9] The crosslinkable fluororubber composition according to any one of [1] to [8], which further contains an organic peroxide.
[10] A crosslinked rubber article formed by crosslinking the crosslinkable fluororubber composition as defined in any one of [1] to [9].
[11] The crosslinked rubber article according to [10], which is a sealing material.

Advantageous Effects of Invention

The crosslinkable fluororubber composition of the present invention, containing the compound represented by the above formula (A), has an excellent crosslinkability such as peroxide crosslinkability or radiation crosslinkability and a high crosslinking rate. Further, the crosslinked rubber article of the present invention, formed by crosslinking the crosslinkable fluororubber composition, has excellent flexibility at a low temperature and good low-temperature characteristics, and also has excellent basic properties such as strength, hardness, modulus and compression set.

DESCRIPTION OF EMBODIMENTS

Hereinafter in this specification, a compound represented by the formula (A) will be also referred to as a compound (A). The same applies to other compounds. Further, a group represented by the formula (X) will be also referred to as a group (X). The same applies to other groups.
(Crosslinkable Fluororubber Composition)
The crosslinkable fluororubber composition of the present invention has a composition comprising at least a fluororubber and the following compound (A):

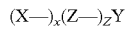  (A)

[Compound (A)]
Now, the compound (A) to be used for the crosslinkable fluororubber composition of the present invention will be described. The compound (A) functions as a crosslinking coagent in the crosslinkable fluororubber composition of the present invention.
X in the compound (A) is a monovalent group represented by the following formula (X):

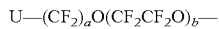  (X)

In the group (X), a is an integer of from 0 to 20, preferably an integer of from 0 to 10, particularly preferably an integer of from 0 to 2. Further, b is an integer of from 1 to 200, preferably an integer of from 1 to 100, particularly preferably an integer of from 1 to 20. Further, U is a monovalent group having at least one member selected from the group consisting of an unsaturated hydrocarbon, a bromine atom and an iodine atom. As specific examples of a case where U is the group having an unsaturated hydrocarbon, the following structures (U-1) to (U-13) may be mentioned.

 (U-1)

 (U-2)

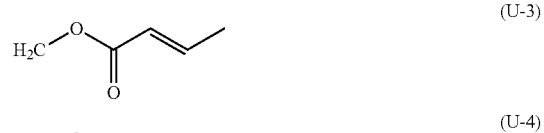 (U-3)

 (U-4)

 (U-5)

 (U-6)

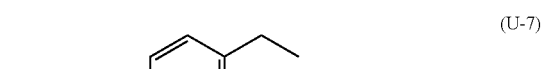 (U-7)

 (U-8)

 (U-9)

 (U-10)

 (U-11)

 (U-12)

-continued

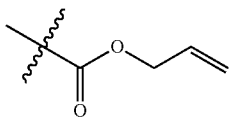
(U-13)

Among them, (U-8), (U-9), (U-11) or (U-12) is preferred since it has a structure having an allyl group bonded to N, and (U-11) or (U-12) is particularly preferred.

Further, as specific examples of a case where U is the monovalent group having a bromine atom, the following structures may be mentioned. In the formulae, n is an integer of from 1 to 3.

$Br(CH_2)_n$—

$Br(CH_2)_nC(O)O$—$CH_2$—

Further, as specific examples of a case where U is the monovalent group having an iodine atom, the following structures may be mentioned. In the formulae, n is an integer of from 1 to 3.

$I(CH_2)_n$—

$I(CH_2)_nC(O)O$—$CH_2$—

As the group (X), a structure represented by the following formula (X1) is preferred.

$U$—$CF_2O(CF_2CF_2O)_b$— (X1)

In the compound (A), Z is a monovalent group represented by the following formula (Z):

$R^FO(CF_2CF_2O)_c$— (Z)

In the group (Z), c is an integer of from 3 to 200, preferably an integer of from 3 to 100, particularly preferably an integer of from 5 to 50. Further, $R^F$ is a $C_{1-20}$ linear perfluoroalkyl group or such a group having an etheric oxygen atom inserted between carbon atoms thereof, and it particularly preferably has from 1 to 16 carbon atoms. As specific examples of $R^F$, the following groups may be mentioned. In the formulae, s is an integer of from 0 to 15, $C_y^F$ is a perfluorocyclohexyl group, t is an integer of from 0 to 15, $A_d^F$ is a perfluoroadamantyl group, and t is an integer of from 0 to 15.

$CF_3(CF_2)_s$—

$C_y^F$—$(CF_2)_t$—

$A_d^F$—$(CF_2)_t$—

In the compound (A), Y is a (x+z) valent perfluoro saturated hydrocarbon group or such a group having an etheric oxygen atom inserted between carbon atoms thereof, x+z as a valence of the group (Y) is an integer of at least 3, preferably from 3 to 110, particularly preferably from 3 to 9.

As specific examples of a case where the group (Y) is a trivalent group, the groups ($Y^3$-1) to ($Y^3$-4) may be mentioned, wherein the group ($Y^3$-4) is a perfluorocyclohexane-1,3,5-triyl group. Further, as specific examples of a case where the group (Y) is a tetravalent group, the groups ($Y^4$-1) to ($Y^4$-5) may be mentioned. Further, as a specific example of a case where the group (Y) is a pentavalent group, the group ($Y^5$-1) may be mentioned.

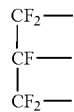
($Y^3$-1)

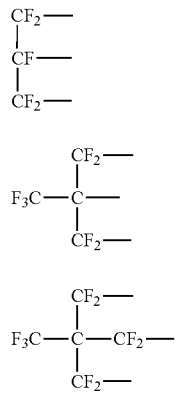
($Y^3$-2)

($Y^3$-3)

($Y^3$-4)

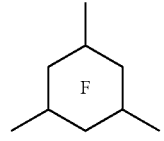
($Y^4$-1)

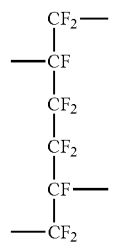
($Y^4$-2)

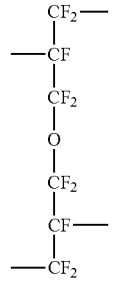
($Y^4$-3)

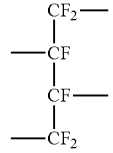
($Y^4$-4)

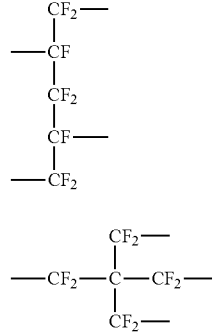
($Y^4$-5)

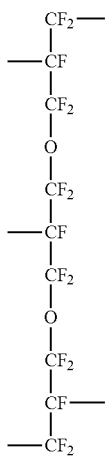

(Y⁵-1)

As the group (Y), the groups (Y³-1) to (Y³-4) are preferred.

The compound (A) is a compound in which x number of groups (X) and z number of groups (Z) are bonded to the group (Y), wherein x is an integer of at least 3, z is an integer of at least 0, and (x+z) is an integer of at least 3. That is, the compound (A) is a compound in which at least three groups (X) are bonded to the group (Y) and the group (Z) is optionally bonded thereto.

Since the compound (A) has at least three groups (X) having a linear perfluoropolyether bond (a moiety of "—(CF$_2$CF$_2$O)$_b$—" in the group (X)), the compound (A) is excellent in flexibility at a low temperature. Further, the group (X) has U (hereinafter, referred to as a reactive group (U)) as a monovalent group having at least one member selected from the group consisting of an unsaturated hydrocarbon, a bromine atom and an iodine atom. Therefore, at the time of crosslinking treatment of a fluororubber composition containing the compound (A), the compound (A) is bonded to a fluororubber and further three-dimensionally crosslinked therewith, whereby the compound (A) is stably incorporated into the fluororubber. Accordingly, it is possible to suppress bleeding out of the compound (A) on the surface of a crosslinked fluororubber as a final product, and it is possible to maintain excellent low-temperature characteristics over a long period. Further, since it is thus possible to suppress bleeding out of the compound (A), it is possible to suppress mold contamination at the time of molding, stickiness of the surface, etc. Further, the compound (A) is bonded to a fluororubber and further three-dimensionally crosslinked therewith, whereby it is possible to improve basic properties such as strength, hardness, modulus or compression set of a crosslinked rubber article obtainable.

In the compound (A), x is an integer of at least 3, preferably from 3 to 100, particularly preferably from 3 to 8. Further, z is an integer of at least 0, preferably from 0 to 10, more preferably from 0 to 1, particularly preferably 0. Further, (x+z) is an integer of at least 3, preferably from 3 to 110, more preferably from 3 to 9, particularly preferably 3 or 4. When x is at least 3, the compound (A) can be three-dimensional crosslinked in the fluororubber.

That is, the compound (A) is preferably a compound represented by the following formula (A1):

(X—)$_{x1}$Y    (A1)

wherein x1 is an integer of 3 or 4.

As specific examples of a case where the group (Y) is a trivalent group in the compound (A), the compounds (A³-1) to (A³-4) may be mentioned. Further, as specific examples of a case where the group (Y) is a tetravalent group, the compounds (A⁴-1) to (A⁴-10) may be mentioned. Among them, from the viewpoint of balance between crosslinkability and low-temperature characteristics, (A³-1), (A⁴-1) or (A⁴-2) is preferred.

(A³-1)

(A³-2)

(A³-3)

(A³-4)

(A⁴-1)

(A⁴-2)

(A⁴-3)

-continued

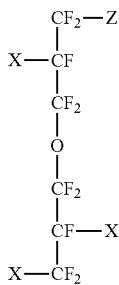 (A⁴-4)

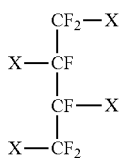 (A⁴-5)

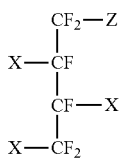 (A⁴-6)

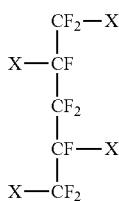 (A⁴-7)

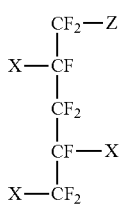 (A⁴-8)

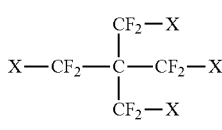 (A⁴-9)

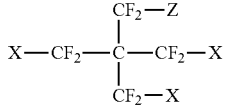 (A⁴-10)

A preferred specific example of the compound (A) may be a compound represented by the following formula (A2):

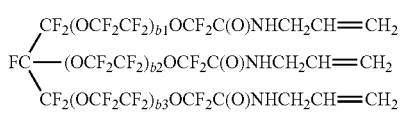 (A2)

wherein each of b1, b2 and b3 which are independent of one another, is an integer of from 1 to 20, preferably an integer of from 1 to 10.

The number average molecular weight (hereinafter also referred to as Mn) of the compound (A) is preferably from 500 to 100,000, more preferably from 1,000 to 20,000. If Mn is less than 500, the low-temperature characteristics tend to be insufficient, and if Mn exceeds 100,000, the crosslinkability tends to deteriorate.

The ratio (hereinafter, also referred to as Mw/Mn) of the mass average molecular weight (hereinafter, also referred to as Mw) to the number average molecular weight (Mn) of the compound (A) is preferably from 1.0 to 2.0.

Further, in the present invention, Mn and Mw are values measured by gel permeation chromatography (hereinafter, referred to as GPC), and Mw/Mn is a value determined from Mn and Mw measured by GPC.

The compound (A) may, for example, be produced in such a manner that the compound (AO) is produced by a method disclosed in WO2005/068534, and the terminal of the compound is converted by a known method. In the compound (AO), Rd is a lower alkyl group.

$$(R^dOC(O)\text{---}CF_2O(CF_2CF_2O)_b\text{---})_a\text{---})_zY \quad (AO)$$

Further, the value of x or z may be changed depending upon the reaction conditions of the fluorination step in the production of (AO) (e.g. [0043] and [0044] in JP-A-2009-197210). Accordingly, there is a case where the compound (A) contains a compound wherein x is at most 2. In such a case, the compound wherein x is at most 2, is not included in the compound (A) of the present invention, but at the time of using the compound (A) as a crosslinking coagent of a fluororubber, the compound (A) may be used as it is, without separating the compound wherein x at most 2.

Further, in this specification, since the compound (A) has at least x number of the reactive groups (U), the compound (A) will be sometimes referred to as an x functional compound. The compound (A) will be referred to as e.g. a trifunctional compound when x is 3, or a tetrafunctional compound when x is 4. Further, the compound wherein x is at most 2, as a by-product, will be also referred to as a monofunctional compound or a bifunctional compound.

The compound (A) obtained by the reaction may be used as it is as a solution after the reaction, or it may be used after removing an unnecessary solvent and raw materials by e.g. concentration. Further, purification may be carried out as the case requires. As a means for the purification, washing with water or an organic solvent which undergoes phase separation from the compound (A), removal of e.g. metal impurities or anion impurities by an ion adsorbing polymer, supercritical extraction or column chromatography may be mentioned, and these means may be combined.

In the crosslinkable fluororubber composition of the present invention, the content of the compound (A) is preferably from 1 to 50 parts by mass, more preferably from 5 to 50 parts by mass, most preferably from 10 to 50 parts by mass, based on 100 parts by mass of the fluororubber. If the content of the compound (A) is too low, the flexibility at a low temperature cannot be improved in some cases, and therefore the effect of improving the low-temperature characteristics tend to be small. If the content of the compound (A) is too high, the compound (A) tends to bleed out from a rubber article after crosslinking. If the content of the compound (A) is from 1 to 50 parts by mass based on 100 parts by mass of the fluororubber, the crosslinking rate becomes high, and a crosslinked rubber article excellent in low-temperature characteristics can readily be obtained.

[Fluororubber]

Now, a fluororubber to be used for the crosslinkable fluororubber composition of the present invention will be described.

The fluororubber is not particularly limited. A vinylidene fluoride/hexafluoropropylene copolymer, a vinylidene fluoride/tetrafluoroethylene/hexafluoropropylene copolymer, a vinylidene fluoride/chlorotrifluoroethylene copolymer, a tetrafluoroethylene/propylene copolymer, a tetrafluoroethylene/propylene/vinylidene fluoride copolymer, a hexafluoropropylene/ethylene copolymer, a tetrafluoroethylene/perfluoroalkyl vinyl ether copolymer or a vinylidene fluoride/tetrafluoroethylene/perfluoroalkyl vinyl ether copolymer may, for example, be mentioned. One or more of them may be used in combination. Among them, a tetrafluoroethylene/propylene copolymer, a vinylidene fluoride/tetrafluoroethylene/hexafluoropropylene copolymer or a tetrafluoroethylene/perfluoroalkyl vinyl ether copolymer is preferably used from a reason that the chemical resistance is excellent.

The fluorine content in the fluororubber is preferably at least 40 mass %, more preferably at least 50 mass %, most preferably at least 55 mass %. The fluororubber having a fluorine content of at least 40 mass %, can give a crosslinked rubber article excellent in the heat resistance, the chemical resistance, the electrical insulating performance or the steam resistance.

As a preferred example of a fluororubber which is in the market, "AFLAS150P" (tradename, manufactured by Asahi Glass Company, Limited, a tetrafluoroethylene/propylene copolymer) may, for example, be mentioned.

[Organic Peroxide]

The crosslinkable fluororubber composition of the present invention may further contain an organic peroxide. Any organic peroxide may be used so long as it can readily generate radicals, under heating. Among them, it is preferred to use an organic peroxide having a temperature at which the half-life period becomes one minute, being from 130 to 220° C. As specific examples, 1,1-di(t-hexylperoxy)-3,5,5-trimethylcyclohexane, 2,5-dimethylhexane-2,5-dihydroperoxide, di-t-butyl peroxide, t-butylcumyl peroxide, dicumyl peroxide, α,α'-bis(t-butylperoxy)-p-diisopropylbenzene, 2,5-dimethyl-2,5-di(t-butylperoxy)-hexane, 2,5-dimethyl-2,5-di(t-butylperoxy)-hexyne-3, dibenzoyl peroxide, t-butylperoxybenzene, 2,5-dimethyl-2,5-di(benzoylperoxy)hexane, t-butylperoxy maleic acid or t-hexylperoxyisopropyl monocarbonate may, for example, be mentioned, and α,α'-bis(t-butylperoxy)-p-diisopropylbenzene is preferred. As the organic peroxide, one or more of them may be used in combination.

The content of the organic peroxide is preferably from 0.1 to 5 parts by mass, more preferably from 0.2 to 4 parts by mass, most preferably from 0.5 to 3 parts by mass, based on 100 parts by mass of a fluororubber. When the content is within such a range, the crosslinking efficiency of the organic peroxide becomes high, whereby it is also possible to suppress the production amount by invalid decomposition. However, in a case where the crosslinkable fluororubber composition is subjected to crosslinking treatment by irradiation with radioactive rays, it is not especially necessary to incorporate the organic peroxide.

[Other Components]

In the crosslinkable fluororubber composition of the present invention, a polyfunctional compound may further be incorporated as a crosslinking coagent. The polyfunctional compound may, for example, be triallyl cyanurate, triallyl isocyanurate, a triallyl isocyanurate prepolymer, trimethallyl isocyanurate, 1,3,5-triacryloylhexahydro-1,3,5-triazine, triallyl trimellitate, m-phenylenediaminebismaleimide, p-quinonedioxime, p,p'-dibenzoyl quinonedioxime, dipropargyl terephthalate, diallyl phthalate, N,N',N'',N'''-tetraallylterephthalamide or a vinyl group-containing siloxane oligomer such as polymethylvinylsiloxane or polymethylphenylvinylsiloxane. Among them, a polyallyl compound is preferred, triallyl cyanurate, triallyl isocyanurate or trimethallyl isocyanurate is more preferred, and triallyl isocyanurate is further more preferred. By using the compound (A) and triallyl isocyanurate in combination, it is possible to more effectively suppress bleeding out from a crosslinked rubber article. As the polyfunctional compound, one or more of them may be used in combination. In a case where the polyfunctional compound is incorporated, the content is preferably from 0.1 to 20 parts by mass, more preferably from 0.2 to 10 parts by mass, based on 100 parts by mass of the compound (A). If the content of the polyfunctional compound is less than 0.1 part by mass, the effect of addition of the polyfunctional compound can hardly be obtained, and if it exceeds 20 parts by mass, the moldability is likely to be impaired.

The crosslinkable fluororubber composition of the present invention may contain a filler. By incorporating the filler, it is possible to improve the strength of a crosslinked rubber article obtainable. As the filler, carbon black may preferably be used. Any carbon black may be used so long as it is one used as blended with a rubber. As specific examples, furnace black, acetylene black, thermal black, channel black or graphite may be mentioned. Among them, furnace black is more preferred, and as a specific example, preferred is a grade such as HAF-LS, HAF, HAF-HS, FEF, GPF, APF, SRF-LM, SRF-HM or MT, and most preferred is MT.

In a case where the filler is incorporated, the content is preferably from 5 to 100 parts by mass, more preferably from 10 to 50 parts by mass, based on 100 parts by mass of a fluororubber. If the content of the filler is less than 5 parts by mass, an effect of addition of the filler can hardly be obtained, and if the content exceeds 100 parts by mass, the elongation property of a crosslinked rubber article is likely to deteriorate. When the content of the filler is within the above range, the balance between strength and elongation of a crosslinked rubber article obtainable becomes good.

The crosslinkable fluororubber composition of the present invention may contain other additives such as a reinforcing material, a processing aid, a lubricant, a lubricant agent, a flame retardant, an antistatic agent and a colorant.

The above reinforcing material may, for example, be a fluororesin such as a polytetrafluoroethylene or an ethylene/tetrafluoroethylene copolymer, glass fibers, carbon fibers or white carbon. In the case of containing a reinforcing material, the content is preferably from 5 to 200 parts by mass, more preferably from 10 to 100 parts by mass, based on 100 parts by mass of a fluororubber.

The above processing aid may, for example, be an alkali metal salt of a higher fatty acid, and a stearate or a laurate is preferred. In the case of containing a processing aid, the content is preferably from 0.1 to 20 parts by mass, more preferably from 0.2 to 10 parts by mass, most preferably from 1 to 5 parts by mass, based on 100 parts by mass of a fluororubber. If the amount of the processing aid becomes too large, a bloom is likely to be formed on the surface of a crosslinked rubber article, the hardness of a crosslinked rubber article tends to be too high, or the chemical resistance or the steam resistance is likely to be low. If the amount of the processing aid is too small, the tensile strength of the crosslinked rubber article tends to be remarkably low, or a change in elongation or tensile strength after the heat aging resistance tends to be remarkably large.

(Preparation Method of Crosslinkable Fluororubber Composition)

A preparation method of the crosslinkable fluororubber composition of the present invention is not particularly limited, and may be a known method. Preferred is a method of kneading a fluororubber, the above compound (A) and, as the case requires, an organic peroxide, a carbon black or other additives, by using a kneading machine such as a twin roll, a Banbury mixer or a kneader. Further, it is also possible to employ a preparation method in which the above respective components are dissolved and dispersed in a solvent, followed by kneading in such a state.

The order of mixing the above respective components is not particularly limited, but it is preferred that, first of all, components which are hardly reactive or decomposable by heat generation is sufficiently kneaded with a fluororubber, and then e.g. an organic peroxide as a component which is readily reactive or decomposable, is blended therein, followed by kneading. At the time of the kneading, it is preferred to cool the kneading machine with water so as to keep a temperature within a range of from 80 to 120° C. as a temperature at which crosslinking reaction does not occur.

(Crosslinked Rubber Article)

The crosslinked rubber article of the present invention may be obtainable by molding the crosslinkable fluororubber composition of the present invention, by means of a known method such as extrusion molding, injection molding, transfer molding or press molding, followed by crosslinking. The molding and crosslinking may be carried out at the same time, or they may respectively be carried out separately in different steps.

For example, in the cavity of a mold having a shape for one or a few crosslinked rubber articles, a crosslinkable fluororubber composition containing an organic peroxide is filled, and the mold is heated to obtain a crosslinked rubber article (primary crosslinked product). The heating temperature is preferably from 130 to 220° C., more preferably from 140 to 200° C., most preferably from 150 to 180° C. Further, as the case requires, it is also preferred that this crosslinked rubber article (primary crosslinked product) is further heated by e.g. an oven employing electricity, heated air or steam as a heat source so as to carry out crosslinking (hereinafter, also referred to as secondary crosslinking), such being also preferred. By carrying out the secondary crosslinking, a residue of an organic peroxide contained in the crosslinked rubber article is decomposed and volatilized to be reduced. A heating temperature during the secondary crosslinking is preferably from 150 to 280° C., more preferably from 180 to 260° C., most preferably from 200 to 250° C. A secondary crosslinking time is preferably from 1 to 48 hours, more preferably from 4 to 24 hours.

Further, the crosslinkable fluororubber composition of the present invention may also be crosslinked by applying ionizing radiation such as electron beam or γ-ray. To produce a crosslinked rubber article by applying ionizing radiation, e.g. a method of dissolving and dispersing the crosslinkable fluororubber composition of the present invention in a proper solvent, applying a resulting suspension solution to mold and then drying it, and then applying ionizing radiation to obtain a crosslinked rubber article, or a method of molding the crosslinkable fluororubber composition of the present invention into a prescribed shape, and then applying ionizing radiation to obtain a crosslinked rubber article, may, for example, be mentioned. The exposure dose by ionizing radiation may suitably be selected, but is preferably from 1 to 300 kGy, preferably from 10 to 200 kGy.

The crosslinked rubber article of the present invention can suitably be used in a wide range as members such as a sealing material such as an O ring, a sheet, a gasket, an oil seal or a bearing seal, a diaphragm, a buffer material, a vibration absorber, a wire covering material, an industrial belt, a tube/hose and a sheet, in a wide field of e.g. a transportation machine such as an automobile, a general instrument or an electrical apparatus. Among them, it may suitably be used as a sealing material such as an O ring, a sheet, a gasket, an oil seal or a bearing seal, from the viewpoint of excellent flexibility at a low temperature, and further from the viewpoint of excellent basic properties such as strength, hardness, modulus or compression set.

EXAMPLES

Now, the present invention will be described in detail with reference to Examples, but it should be understood that the present invention is by no means restricted to such specific Examples.

[Materials to Be Used]

Blended components to be used in the following Examples and Comparative Examples, are as follows.

(1) Fluororubber

Polymer 1: Tetrafluoroethylene/perfluoroalkyl vinyl ether type bipolymer (trade name: AFLAS PFE1000, manufactured by Asahi Glass Company, Limited, peroxide crosslinking type, fluorine content: 72 mass %)

Polymer 2: Tetrafluoroethylene/propylene/vinylidene fluorine terpolymer (trade name: AFLAS 200P, manufactured by Asahi Glass Company, Limited, peroxide crosslinking type, fluorine content: 60 mass %)

Polymer 3: Tetrafluoroethylene/propylene bipolymer (trade name: AFLAS 100S, manufactured by Asahi Glass Company, Limited, peroxide crosslinking type, fluorine content: 57 mass %)

(2) Crosslinking Coagent

Crosslinking coagent 1: A composition having, as a main component, a compound (A2') obtained in the following Preparation Example, and having Mn of 2,900 and Mw/Mn of 1.14

TAIC: Triallyl isocyanurate (manufactured by Nippon Kasei Chemical Co., Ltd.)

(3) Organic Peroxide

Perbutyl P: α,α'-Bis(t-butylperoxy)-p-diisopropylbenzene (trade name: PERKADOX 14, manufactured by NOF CORPORATION)

PERHEXA 25B: 3,5-Dimethyl-2,5-di-t-butylperoxyhexane (trade name: PERHEXA 25B, manufactured by NOF CORPORATION)

(4) Filler

MT Carbon: Carbon black (grade: MT Carbon, manufactured by CANCARB)

(5) Processing Aid

NONSOUL SN-1: Sodium stearate (manufactured by NOF CORPORATION)

(Preparation of Crosslinking Coagent 1)

The interior of a 100 mL round flask having a stirrer chip put therein, was sufficiently replaced with nitrogen. 20.0 g of a composition having the following compound (A0-1) as a main component and 20 g of dichloropentafluoropropane were charged in the round flask, followed by intense stirring. After one hour, a mixture of 1.5 g of $CH_2$=$CHCH_2NH_2$ and 20 g of dichloropentafluoropropane was slowly dropwise added over a period of 0.5 hour from a dropping funnel provided on the upper part of the round flask. After completion of the dropwise addition, the interior was heated to 50° C., stirred continuously for 6 hours, and then cooled to room temperature.

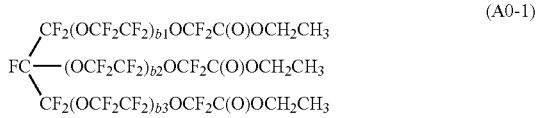

(A0-1)

A crude fluid obtained was concentrated by an evaporator, and a residue was washed twice with 0.1 L of n-hexane to obtain 18.8 g of a composition as a colorless liquid at room temperature. This composition was such that at least 99.9 mol % of "—C(O)OCH$_2$CH$_3$" of the above compound (A0-1) was converted to "—C(O)NHCH$_2$CH═CH$_2$", and the following compound (A2') was a main component. Further, an average value of b1+b2+b3 in the composition having the formula (A2') as a main component was 21.1 as a result of an NMR measurement. This composition was regarded as a crosslinking coagent 1.

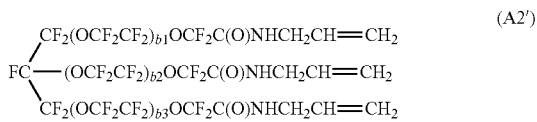

(A2')

The compound (A2') was subjected to NMR analysis, HPLC analysis and GPC analysis under temperature conditions of room temperature (25° C.), whereby formation of the compound (A2') was confirmed.

<NMR Analysis>

As a standard substance of $^1$H-NMR (300.4 MHz), tetramethylsilane was used. Further, as a standard substance of $^{19}$F-NMR (282.7 MHz), CFCl$_3$ was used. Further, as a solvent, CCl$_2$FCClF$_2$ was used unless otherwise specified.

<HPLC Analysis>

The compositional ratio of the compounds in the composition was measured by a HPLC analyzer (Prominence, manufactured by Shimadzu Corporation) under the following conditions. Specifically, in each run, the HFIP concentration in the mobile phase was gradually increased from 0% to 100%, and the mass ratio of compounds in the composition eluted, was analyzed.

Analytical column: Normal phase silica gel column (SIL-gel, manufactured by YMC Co., Ltd.)

Mobile phase: Dichloropentafluoropropane (ASAHIKLIN AK-225G, manufactured by Asahi Glass Company, Limited) and HFIP Mobile phase flow rate: 1.0 mL/min Column temperature: 37° C.

Detector: Evaporative light scattering detector

<GPC Analysis>

A number average molecular weight (Mn) and a mass average molecular weight (Mw) were measured by GPC in accordance with JP-A-2001-208736 under the following conditions, and Mw/Mn was determined.

Mobile phase: Solvent mixture of dichloropentafluoropropane (ASAHIKLIN AK-225SEC grade 1, manufactured by Asahi Glass Company, Limited) and hexafluoroisopropyl alcohol (dichloropentafluoropropane/hexafluoroisopropyl alcohol=99/1 in volume ratio)

Analytical column: Serially connected two PLgel MIXED-E columns (manufactured by Polymer Laboratories)

Molecular weight standard samples: Four perfluoropolyethers having Mw/Mn less than 1.1 and molecular weights of from 2,000 to 10,000 and one perfluoropolyether having Mw/Mn of at least 1.1 and a molecular weight of 1,300

Mobile phase flow rate: 1.0 mL/min

Column temperature: 37° C.

Detector: Evaporative light scattering detector

As a result of the HPLC analysis, the crosslinking coagent 1 obtained was found to be a composition containing 7.0 mass % of a monofunctional compound, 30.8 mass % of a bifunctional compound, 42.9 mass % of a trifunctional compound (A2'), 18.1 mass % of a tetrafunctional compound and 1.2 mass % of a compound having more than 4 functional groups. Accordingly, the proportion of the compound (A) having 3 or more functional groups, which is effective for three dimensional crosslinking, was 62.2 mass %. A monofunctional compound and a bifunctional compound were compounds having a small number of functional groups, which were formed as by-products in a fluorination step, and even though such compounds are not the compound (A), the crosslinking coagent 1 was used as it is without separating the compounds.

As a result of the GPC analysis, a number average molecular weight (Mn) of the crosslinking coagent 1 was 2,900, and Mw/Mn was 1.14. Further, it was confirmed that the crosslinking coagent 1 has no structure of —OCF$_2$O—.

As a result of the NMR analysis, the following results were obtained as $^1$H-NMR spectrum and $^{19}$F-NMR spectrum.

$^1$H-NMR spectrum σ (ppm): 7.09, 5.92, 5.38 to 5.20, 3.72

$^{19}$F-NMR spectrum σ (ppm): −54.0, −77.6, −88.2 to −92.0, −135.0 to −139.0

[Measurement of Crosslinked Rubber Article]

TR-10 value, hardness (HS), tensile strength (T$_B$), elongation (E$_B$), compression set and 100% tensile stress (M$_{100}$) of a crosslinked rubber article in each of the following Examples and Comparative Examples, were measured by the following methods.

Low-temperature elastic retraction test: In accordance with JIS K6261, the low temperature elastic retraction test was carried out by a low temperature elastic retraction tester (TR Tester, manufactured by Ueshima Seisakusho Co., Ltd.) to measure the TR-10 value.

Hardness: In accordance with JIS K6253, hardness (HS) was measured by a durometer type A hardness test at 23° C. When the hardness is from 60 to 90, the article is suitable as a sealing material.

Tensile strength: In accordance with JIS K6251, tensile strength (T$_B$) was measured at 23° C. When the tensile strength (T$_B$) is at least 10 MPa, the article is suitable as a sealing material.

Elongation: In accordance with JIS K6251, elongation (E$_B$) was measured at 23° C. When the elongation (E$_B$) is at least 160%, the article is suitable as a sealing material.

Compression set: In accordance with JIS K6262, compression set was measured at 200° C. for 70 hours.

100% tensile stress (modulus): In accordance with JIS K6251, 100% tensile stress (M$_{100}$) was measured at 23° C. When the 100% tensile stress (M$_{100}$) is from 2 to 17 MPa, the article is suitable as a sealing material.

Example 1

100 Parts by mass of the polymer 1, 1 part by mass of the PERHEXA 25B, 5 parts by mass of the crosslinking coagent 1, 20 parts by mass of the MT-Carbon and 1 part by mass of NONSOUL SN-1 were kneaded by a twin screw roller to obtain a peroxide crosslinkable fluororubber composition. The composition was formed into a sheet with 100 mm×100 mm×2 mm by hot pressing at 170° C. (primary crosslinking). Further, this sheet was put in a gear oven for 4 hours at 250° C., to carry out secondary crosslinking.

From a crosslinked rubber sheet obtained, four sheets of samples were punched out by a #3 dumbbell to measure the properties of the crosslinked rubber. Further, in accordance with JIS K6250, four samples for low-temperature elastic retraction test were prepared to carry out a low-temperature elastic retraction test. The results are shown in Table 1. This crosslinked rubber article has a hardness (HS) of 61, a tensile strength ($T_B$) of 19.8 MPa, an elongation ($E_B$) of 232%, a 100% tensile stress ($M_{100}$) of 9.0 MPa, a compression set of 30% and a TR-10 value of −7.6° C.

Examples 2 to 6 and Comparative Examples 1 to 3

A crosslinked rubber sheet was prepared in the same manner as in Example 1 except that the respective blend components were changed as shown in Table 1, and the properties of the crosslinked rubber article were measured in the same manner as the above.

TABLE 1

| | | | Ex. 1 | Ex. 2 | Ex. 3 | Comp. Ex. 1 | Ex. 4 | Comp. Ex. 2 | Ex. 5 | Ex. 6 | Comp. Ex. 3 |
|---|---|---|---|---|---|---|---|---|---|---|---|
| Blend composition (part by mass) | Fluororubber | Polymer 1 | 100 | 100 | 100 | 100 | | | | | |
| | | Polymer 2 | | | | | 100 | 100 | | | |
| | | Polymer 3 | | | | | | | 100 | 100 | 100 |
| | Crosslinking coagent | Crosslinking coagent 1 | 5 | 10 | 25 | | 25 | | 10 | 25 | |
| | | TAIC | | | | 5 | | 5 | | | 5 |
| | Organic peroxide | Perbutyl P | | | | | 1 | 1 | 1 | 1 | 1 |
| | | PERHEXA 25B | 1 | 1 | 1 | 1 | | | | | |
| | Filler | MT Carbon | 20 | 20 | 20 | 20 | 20 | 20 | 20 | 20 | 20 |
| | Processing aid | NONSOUL SN-1 | 1 | 1 | 1 | 1 | 1 | 1 | 1 | 1 | 1 |
| Ordinary state physical properties | Tensile strength ($T_B$) [MPa] | | 19.8 | 19.2 | 11.2 | 17.9 | 9.4 | 17.0 | 15.3 | 11.6 | 18.0 |
| | 100% Tensile stress ($M_{100}$) [MPa] | | 9.0 | 8.7 | 7.2 | 7.0 | 2.3 | 5.0 | 2.0 | 2.5 | 7.0 |
| | Elongation ($E_B$) [%] | | 232 | 231 | 203 | 190 | 326 | 270 | 516 | 362 | 240 |
| | Hardness (HS) | | 61 | 60 | 60 | 73 | 61 | 69 | 59 | 63 | 70 |
| | Specific gravity (SG) [g/cm³] | | 2.00 | 1.98 | 1.97 | 2.00 | 1.68 | 1.61 | 1.59 | 1.61 | 1.59 |
| | Compression set [%] | | 30 | 36 | 42 | 26 | 48 | 36 | 39 | 50 | 36 |
| Low-temperature characteristics | Low-temperature elastic retraction test TR 10 value | | −7.6 | −9.7 | −11.9 | −1.0 | −12.0 | −7.0 | 0.5 | −1.7 | 3.6 |

As shown in Table 1, the crosslinked rubber articles in Examples 1 to 6 have the same ordinary state physical properties as the crosslinked rubber articles in Comparative Examples 1 to 3, a low TR-10 value, and an excellent flexibility at a low temperature. Further, as the amount of the crosslinking coagent 1 added is increased, the TR-10 value was lowered, and the flexibility at a low temperature improved.

On the other hand, the crosslinked rubber articles in Comparative Examples 1 to 3, which were obtained by crosslinking a fluororubber composition containing no crosslinking coagent 1 (compound (A2)) were such that the TR-10 value of each crosslinked rubber article obtained by using the same fluororubber was high, and the flexibility at a low temperature was poor, as compared with Examples 1 to 6.

INDUSTRIAL APPLICABILITY

The crosslinked rubber article of the present invention can suitably be used in a wide range as members such as a sealing material such as an O ring, a sheet, a gasket, an oil seal or a bearing seal, a diaphragm, a buffer material, a vibration absorber, a wire covering material, an industrial belt, a tube/hose and a sheet in a wide field of e.g. transportation machine such as an automobile, a general instrument or an electrical apparatus.

This application is a continuation of PCT Application No. PCT/JP2010/067161 filed on Sep. 30, 2010, which is based upon and claims the benefit of priority from Japanese Patent Application No. 2009-229424 filed on Oct. 1, 2009. The contents of those applications are incorporated herein by reference in its entirety.

What is claimed is:

1. A crosslinkable fluororubber composition comprising a fluororubber and a compound represented by the following formula (A):

$$(X-)_x(Z-)_zY \quad (A)$$

wherein X is a group represented by the following formula (X), Z is a group represented by the following formula (Z), Y is a (x+z) valent perfluoro saturated hydrocarbon group or such a group having an etheric oxygen atom inserted between carbon atoms thereof, x is an integer of at least 3, z is an integer of at least 0, x+z is an integer of at least 3, $$U-CF_2)_aO(CF_2CF_2O)_b- \quad (X)$$

$$R^FO(CF_2CF_2O)_c- \quad (Z)$$

wherein U is a monovalent group having at least one member selected from the group consisting of an unsaturated hydrocarbon, a bromine atom and an iodine atom, $R^F$ is a $C_{1-20}$ linear perfluoroalkyl group or such a group having an etheric oxygen atom inserted between carbon atoms thereof, a is an integer of from 0 to 20, b is an integer of from 1 to 200, and c is an integer of from 3 to 200.

2. The crosslinkable fluororubber composition according to claim 1, wherein the compound represented by the formula (A) is a compound represented by the following formula (A1):

$$(X-)_{x1}Y \quad (A1)$$

wherein x1 is an integer of 3 or 4.

3. The crosslinkable fluororubber composition according to claim 2, wherein x1 in the formula (A1) is 3, and Y is any one of the groups ($Y^3$-1) to ($Y^3$-4) represented by the following formulae:

-continued

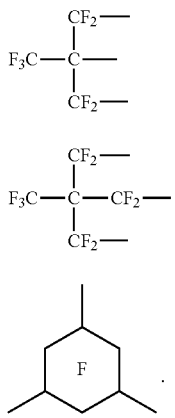

4. The crosslinkable fluororubber composition according to claim 1, wherein the compound represented by the formula (A) is a compound represented by the following formula (A2):

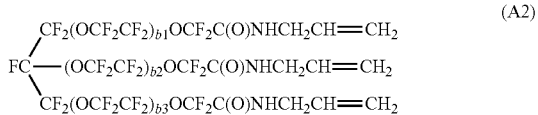

wherein each of b1, b2 and b3 which are independent of one another, is an integer of from 1 to 20.

5. The crosslinkable fluororubber composition according to claim 1, wherein the compound represented by the formula (A) has a number average molecular weight (Mn) of from 500 to 100,000.

6. The crosslinkable fluororubber composition according to claim 1, wherein the compound represented by the formula (A) has a ratio (Mw/Mn) of the mass average molecular weight (Mw) to the number average molecular weight (Mn) of from 1.0 to 2.0.

7. The crosslinkable fluororubber composition according to claim 1, which contains the compound represented by the formula (A) in an amount of from 1 to 50 parts by mass per 100 parts by mass of the fluororubber.

8. The crosslinkable fluororubber composition according to claim 1, wherein the fluororubber is at least one member selected from the group consisting of a tetrafluoroethylene/propylene copolymer, a vinylidene fluoride/tetrafluoroethylene/hexafluoropropylene copolymer and a tetrafluoroethylene/perfluoroalkyl vinyl ether copolymer.

9. The crosslinkable fluororubber composition according to claim 1, which further contains an organic peroxide.

10. A crosslinked rubber article formed by crosslinking the crosslinkable fluororubber composition as defined in claim 1.

11. The crosslinked rubber article according to claim 10, which is a sealing material.

* * * * *